United States Patent [19]

Shaanan

[11] Patent Number: 5,155,960
[45] Date of Patent: Oct. 20, 1992

[54] CAM ACTION CONNECTOR FOR JOINING FURNITURE PANELS

[75] Inventor: Gad Shaanan, West Mount, Canada

[73] Assignee: Indal Furniture Systems A Division of Indal Limited, Weston, Canada

[21] Appl. No.: 617,490

[22] Filed: Nov. 23, 1990

Related U.S. Application Data

[63] Continuation of Ser. No. 287,055, Dec. 21, 1988, abandoned.

[30] Foreign Application Priority Data

Mar. 29, 1988 [CA] Canada .................................. 562855

[51] Int. Cl.$^5$ .......................... F16B 7/04; F16B 12/32
[52] U.S. Cl. ........................................ 52/584; 24/591; 52/581; 52/238.1; 403/292; 403/348; 403/408.1
[58] Field of Search ............ 403/292, 323, 348, 408.1; 52/238.1, 239, 581, 584; 411/84, 85, 349, 549, 550, 553; 406/6, 322, 405.1; 24/287, 573, 590, 591

[56] References Cited

U.S. PATENT DOCUMENTS

| | | | |
|---|---|---|---|
| 3,261,070 | 7/1966 | Abdins ................... | 24/287 |
| 3,456,967 | 7/1969 | Tantlinger et al. ............... | 24/287 X |
| 3,691,595 | 9/1972 | Backteman et al. .............. | 24/591 X |
| 3,752,511 | 8/1973 | Racy ...................... | 403/292 |
| 4,196,673 | 4/1980 | Looks ................. | 24/287 X |
| 4,497,141 | 2/1985 | Jarby ........................ | 403/348 X |
| 4,518,278 | 5/1985 | Koch ....................... | 403/245 X |
| 4,653,970 | 3/1987 | Ballantyne ........................ | 29/432 X |
| 4,762,437 | 8/1988 | Mitomi .............................. | 403/348 X |

FOREIGN PATENT DOCUMENTS

| | | |
|---|---|---|
| 2333993 | 7/1977 | France . |
| 1410993 | 10/1975 | United Kingdom .................. 52/354 |
| 2106211 | 4/1983 | United Kingdom . |

Primary Examiner—Randolph A. Reese
Assistant Examiner—Arlen L. Olsen
Attorney, Agent, or Firm—Neil H. Hughes; Ivor M. Hughes

[57] ABSTRACT

For use in a panel locking system a connecting means (or connector) comprising a pin having two ends and having disposed proximate one end a first laterally or radially extending appendage and proximate the second end a laterally or radially extending second appendage, said appendages extending laterally (or radially) away from the pin, each appendage being radially offset a predetermined number of degrees about the circumference of the pin from the other appendage, each appendage having at least one end and having disposed proximate each end, cam portions for engagement with cam surfaces disposed proximate first and second channels or openings of a panel system, said first appendage being radially oriented extending substantially normal to the central axis of said pin in a first direction and said remaining appendage being radially offset, said pin having disposed intermediate its ends between the appendages detent means for rotating said pin when assembling said furniture system; whereby rotation of said pin in a predetermined direction locks said first appendage in a first channel or opening and further rotation of said pin up to a predetermined amount locks the second appendage in a second channel or opening while retaining said first appendage in a locked position within said first channel or opening.

20 Claims, 5 Drawing Sheets

CAM ACTION CONNECTOR FOR JOINING FURNITURE PANELS

This application is a continuation of Ser. No. 07/287,055, now abandoned.

FIELD OF INVENTION

This invention relates to fastening devices for connecting panels within a furniture system together.

BACKGROUND OF THE INVENTION

Within the prior art there exists a multitude of fasteners or connectors for connecting panels and the like together U S. Pat. No. 4,653,970 by Ballantyne is such a fastener used for connecting panels in a face-to-face orientation. Another example of a fastening device is found in U.S. Pat. No. 4,518,278 wherein a very complex bolt fastening arrangement is provided for connecting detachable panels such as furniture panels. However when connecting panels together by their edges as in an office system, neither of the aforementioned fasteners will serve to adequately solve the problem. Great Britain patent application 2,106,211 published on Apr. 7, 1983 by Iddon provides a fastener as illustrated in FIG. 1 having portions at the ends thereof for simultaneous engagement with the panels being connected wherein upon rotation of the fastener when engaged with the panels the panels will simultaneously move relative to one another. A lever portion 13 is provided in the preferred embodiment of the invention in order to provide the rotation of the fastener when as stated at line 56 of column 1 "rotation of the lever to draw the panels together can allow the lever to move into a gap between the panels caused by the thickness of a sealant strip on the shape of the panels."

Nowhere within the prior art is there found a connector which allows for the independent locking of each fastener within its respective panel while aligning the remaining fastener with the opening within which it will lock when engaging the fastener.

It is therefore an object of this invention to provide improvements to connectors and fasteners for furniture systems wherein the connector may be used to connect two panels together in a simple but very effective manner.

It is a further object of this invention to permit independent fastening of the connector to each of the panels upon rotation of the connector thus allowing for ease of assembly without it being necessary to engage both panels simultaneously.

It is a further object of this invention to provide an economical fastener which may be fabricated from thermoplastic materials.

It is a further object of this invention to provide a connector which will readily engage existing channel portions disposed within a furniture system or panel system without the need to substantially alter the channels of the panel system.

Further and other objects of the invention will become apparent to the man skilled in the art when considering the following summary of the invention and the more detail description of the preferred embodiments illustrated herein.

SUMMARY OF THE INVENTION

According to one aspect of the invention there is provided for use as a releasable locking means (or connector) in a furniture system for fastening together elements of the furniture system, some of the elements of the furniture system including a channel within which portions of the locking means engage, thus fastening the elements together, said locking means comprising a rotatable portion having two ends, having disposed proximate one end at least a first fastening means or appendage for engagement in use with a channel and a first alignment means of one of said furniture elements, and having disposed proximate the other end of said rotatable portion, at least a second fastening means or appendage for engagement in use with a channel and a second alignment means of another of said furniture elements, said second fastening means or appendage being engageable in use with the channel and said second alignment means when said first fastening means or appendage locks in use with said channel and said first alignment means, said first and second fastening means being aligned within the channel of the elements of the furniture system by said first and second alignment means, said rotatable portion of said means for manually locking elements of a furniture system having disposed between its ends intermediate said at least a first and at least a second fastening means or appendage, integral detent means for rotating said locking means for manually locking elements of a furniture system (preferably for engagement with a tool) when manually assembling said furniture system, whereby rotation of said locking means for manually locking elements of a furniture system in a predetermined direction locks at least a first fastening means or appendage with said channel and said first alignment means of one furniture element, and further rotation of said locking means for manually locking elements of a furniture system, up to a predetermined amount, locks at least a second fastening means or appendage with said channel and said second alignment means of another furniture element while retaining at least a first fastening means or appendage in a locked position within said first channel and alignment means of the furniture element.

According to yet another aspect of the invention there is provided for use in a panel locking system the panel system having elements including alignment opening and locks surfaces adjacent said alignment openings, a connecting means (or connector) comprising a pin, for example a substantially cylindrical pin, having two ends and having disposed proximate one end a first laterally or radially extending appendage, (for example a radially extending flange and preferably a pair of diametrically opposed radially extending flanges), and proximate the second end a laterally or radially extending second appendage, (for example a radially extending flange and preferably a pair of diametrically opposed radially extending flanges) said appendages extending laterally (or radially as the case may be) away from the substantially cylindrical pin, each appendage being laterally (or radially) offset a predetermined number of degrees about the circumference of the pin from the other appendage, each appendage having at least one end (and where the appendage preferably comprises a pair of diametrically opposed laterally or radially extending flanges two ends) and having disposed proximate each end, portions (preferably arcuate portions) for engagement in use with the locking surfaces adjacent the alignment openings providing alignment of said pin with said panel system, said first appendage being laterally or radially oriented extending substantially normal to the central axis of said (preferably cylindrical) pin in a first direction and said second appendage being radially offset to the first appendage in a second direction, said (preferably cylindrical) pin having disposed intermediate the appendages, detent means for manually rotating said (preferably cylindrical) pin (preferably for engagement with a tool) when assembling said panel system; whereby manual rotation of said (preferably cylindrical) pin in a predetermined direction locks said first appendage with said locking surfaces of the panel system within a first

[channel or]opening of the panel system and further manual rotation of said (preferably cylindrical) pin up to a predetermined amount ( or a predetermined number of degrees) locks the second appendage with said locking surfaces of the panel system within a second opening of the panel system while retaining said first appendage in a locked and aligned position with said locking surfaces of the panel system within said first opening of the panel system, preferably wherein each appendage engages locking surfaces proximate said first and second openings allowing manual rotation of said (preferably cylindrical) pin a predetermined amount until the surfaces lock each appendage in each opening, locking the panels together.

According to yet another aspect of the invention the detent means comprises a hexagonal flange or nut integrally formed with, attached to, or embodied with said cylindrical pin.

According to yet another aspect of the invention the first and second alignment means are aligned openings disposed therein within which the end portions of said locking means extend to properly align said fastening means within said aligned openings.

According to yet another aspect of the invention the locking surfaces of the panels to be connected by the locking means or connecting means (connector) are provided with channel portions of the panels to be connected by the locking means, each channel portion may each comprise sidewalls leading into the channel, and an endwall or bottom wall joining the sidewalls, the bottom wall of one channel of one panel comprising an opening therethrough aligned with another opening in the bottom wall of the channel of the other panel to be joined by a connector such that the ends of the connector (for example a cylindrical pin) engage with the openings thus allowing for alignment of the locking means or connecting means (for example a cylindrical pin) in the panels prior to its rotation.

While the invention may be used to connect panels end to end it will be appreciated that the invention has a number of applications.

BRIEF DESCRIPTION OF THE DRAWINGS

The invention will now be described with respect to the following drawings illustrating preferred and alternative embodiments of the invention in which.

DETAILED DESCRIPTION OF THE EMBODIMENTS

Figure 1:
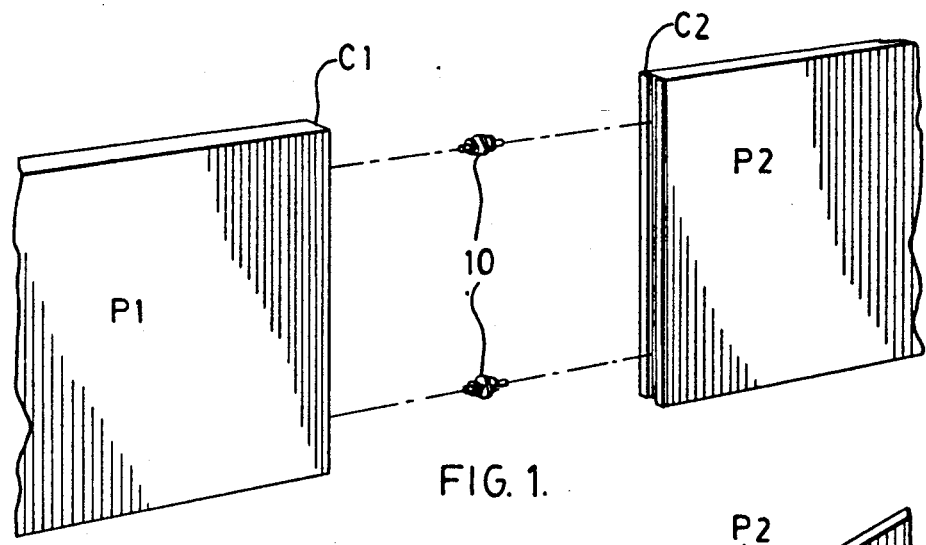
FIG. 1 is a perspective view of two panels being connected by the instant invention in a preferred embodiment of the invention.

Referring now to FIG. 1, there is illustrated panels P1 and P2 which are about to be connected by connectors 10 which will engage within channel portions C1 and C2. Connectors 10 are illustrated in one embodiment being used to connect the panels P1 and P2 end to end.

Figure 2:
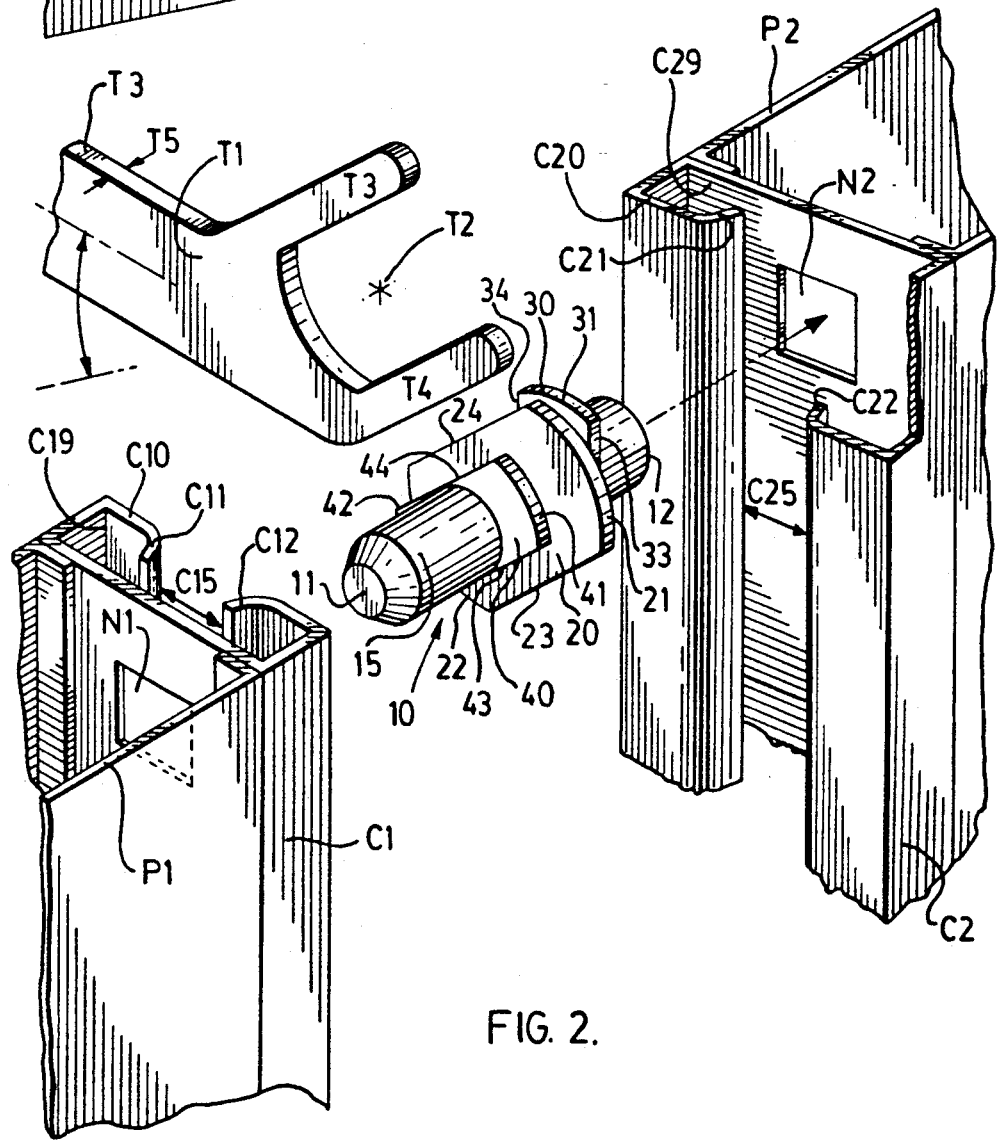
FIG. 2 is a perspective view in close-up of the instant invention when used to connect two panels end to end in a preferred embodiment of the invention.

Referring now to FIG. 2 there is illustrated a close-up view of the upper portion of panels P1 and P2 having a connector therebetween exploded in order to observe all the important portions of said connector 10. Thus panels P1 and P2 are provided with channel portions C1 and C2 connected to the ends of each respective panel by conventional methods and having passing through each channel portion an opening N1 and N2 disposed at the back portion of the channel C1 and C2 respectively. The openings N1 and N2 are positioned in such a way as to allow horizontal alignment of the connecting pin 10 so that the panels will not ride up in relation to one another if the ends of the pin were not contained into position. For example if someone would bump the edges of the panel and the connector was not contained within an opening it might allow the pin to slide within the channel openings C29 and C19 respectively of P2 and P1 depending on the other features embodied within the pin 10. A preferred embodiment thus is to provide the aligning openings N1 and N2 being substantially rectangular in shape, allowing the pin ends 11 and 12 to pass therethrough. This is best observed in a relation to FIG. 8. The channel portions C1 and C2 each have an opening C19 and C29 respectively which is bordered on the ends remote the panel by flanges C10 and C20 having inturned lips C11 and C12, and C21 and C22 respectively, the inturned lips being set apart by a predetermined distance C15 and C25 for each channel C1 and C2.

The connector pin 10 is of substantially cylindrical shape having two ends 11 and 12 and having disposed intermediate the two ends 11 and 12 a detent portion 20 being substantially rectangular in shape in a preferred embodiment having end portions 21 and 22 which are arcuately shaped. The detent portion 20 may also be a hexagonal flange or nut in a further embodiment of the invention as illustrated in FIG. 9A but for simplicity sake it is illustrated as a substantially rectangular member. Disposed between the end 12 and the detent portion 20 is a fastening member 30 being substantially rectangular (and having a similar shape to the detent portion 20) whose extension is offset a predetermined number of degrees along the radial axis of pin 10 in relation to the extension of detent member 20. This is best observed when considering the angle between the side portion 33 and the side portion 23. Thus a fastening member 30 is disposed between the detent member 20 and the end of the pin 12 having arcuate portion 31 and 32 (not shown) disposed at the ends thereof and having rectangular portions 33 and 34 disposed at the sides thereof. The cylindrical pin has intermediate the end 11 and the detent member 20 another fastening member 40 having arcuate ends 41 and 42 and having side portions 43 and 44. In a preferred embodiment the detent portion 20 is substantially similar in shape to the fastening portion 40 and for that matter to the fastening portion 30. In one preferred embodiment the number of degrees which the planes of the detent member and the fastening portion 40 are inclined to one another is zero (the planes are parallel to one another). However the important relationship is the relationship between the skewing of the longitudinal axes of extension for member 30 in relation to member 40 (offsetting member 30 by a predetermined number of degrees to member 40).

Figures 3, 4:
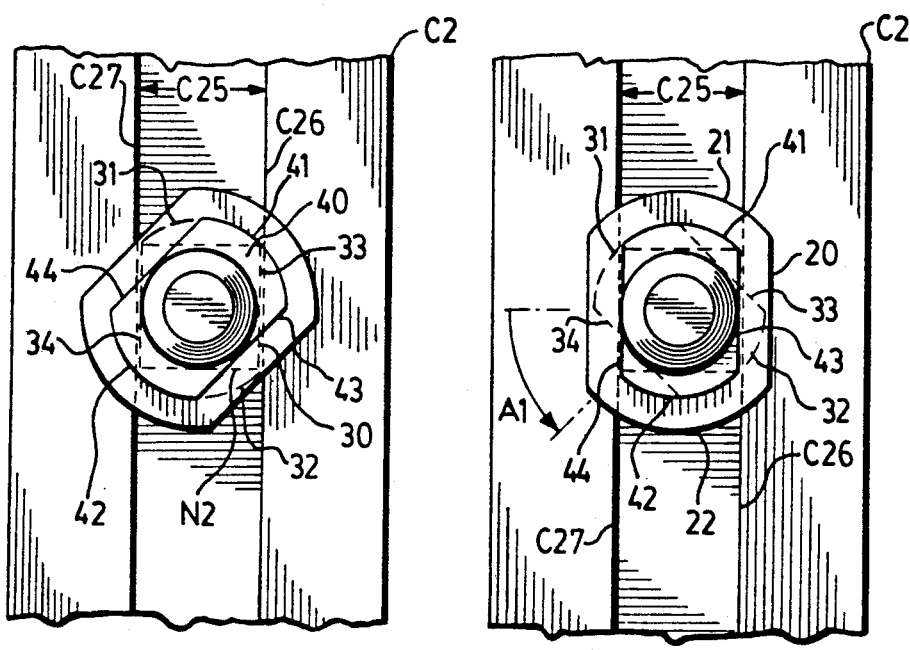
FIG. 3 and 4 is a view along the longitudinal axis of the connector illustrating the functioning of said connector in a preferred embodiment of the invention.

Referring now to FIGS. 3 and 4 there is illustrated an end view of the pin 10 and the schematic interrelationship between the channel portion C2 and the pin 10 when being fastened therein. Thus referring to FIG. 3, the pin 10 at the end 12 is being inserted into an an opening N2 as best seen in relation to FIG. 2. Thus the pin 10 is inserted at end 12 into an opening N2, the pin 10 being oriented in such a way such that the side portions 33 and 34 are disposed in a direction substantially parallel to the sidewalls C26 and C27 of the channel C2. However it will be noted that the fastening portion 40 is set at an angle to the sidewall C27 and C26 when the fastening portion 30 has its side portions 33 and 34 parallel to the side portions C27 and C26. The pin 10 is then rotated a predetermined number of degrees for example approximately 20° by the tool T1,( as best illustrated in FIG. 2). The tool T1 has an opening T2 disposed between T3 and T4, within which opening T2 the detent portion 20 will be engaged, and the handle portion T3 is of a predetermined thickness, T5 being consistent with the separation distance of the channel portions C1 and C2 when the connector is fastened to both channel portions. As a result of the slope of the detent ( or flange ) 20 being compatible with the slope of the opening T2 of tool T1, the orientation of the appendages or flanges 30 and 40 are known when the tool T1 engages the detent 20. The tool T1 is then engaged with the detent member 20 and the pin 10 is rotated a predetermined number of degrees Al as best illustrated in relation to FIG. 4, thus causing the arcuate portions 31 and 32 to engage behind the lip portions C22 and C21 of the channel flanges C20, the predetermined angle Al being sufficient to align the sides 33 and 34 of fastening portion 40 with the side portions C27 and C26 of the channel portion C2 which are parallel to the compatible portions disposed within channel portion C1 as best observed in relation to FIG. 7. Thus the rotation of the pin 10 in the predetermined direction and number of degrees allows for the alignment of the remaining fastening portion 40 with the remaining channel portion C15 (not shown), wherein alignment of the pin 10 at the end 11 through the opening N1 and further rotation of the connector up to a predetermined maximum amount will also lock the arcuate portions 41 and 42 within the opening C19 of channel portion C1.

Figure 5:
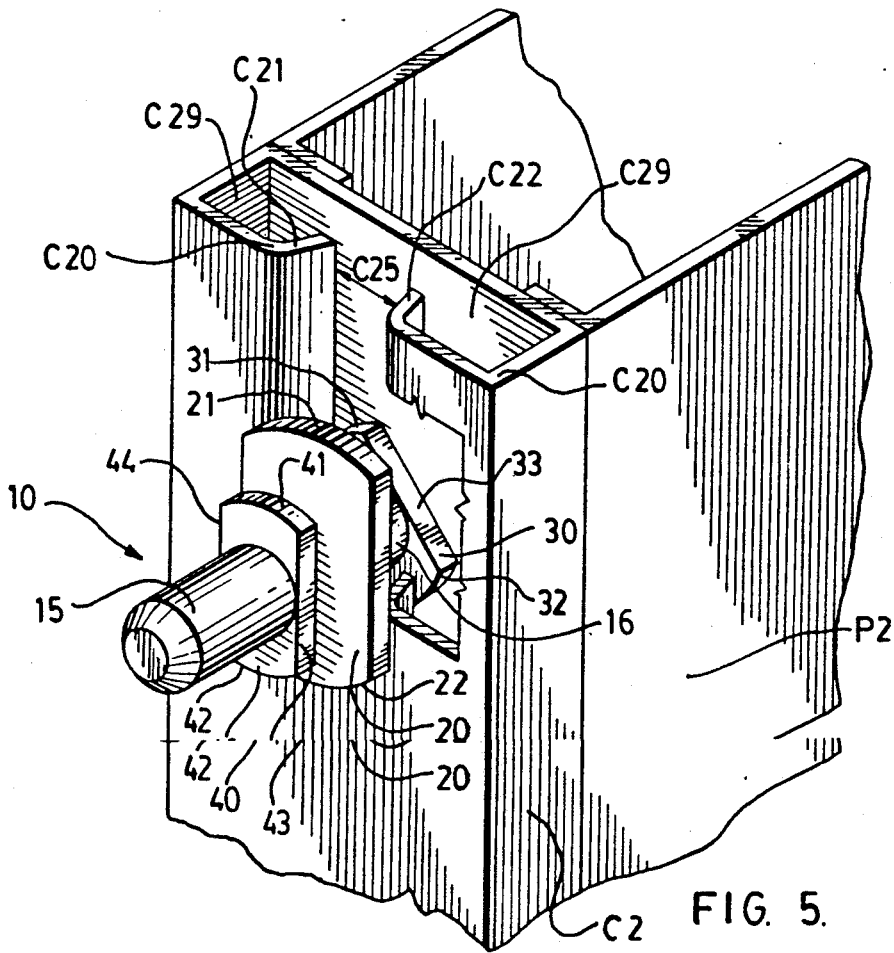
FIG. 5 is a partially exploded perspective view of the connector being fastened to a channel portion of the panel in a preferred embodiment of the invention.

Referring now to FIG. 5 there is illustrated a perspective view of the position of the connector 10 as described in relation to FIG. 4 illustrating the interrelationship between the rotated position of fastening portion 30 and the alignment of portion 40 which may be engaged with the channel portion C1 of panel P1. Thus by rotating the pin 10 after end 12 is inserted with an opening N2 the fastening portion 30 will abut on the face thereof proximate the detent member against the ends of the lips C21 and C22 within opening C29 of the channel C2. Thus the one end of the pin is fastened within the channel. By now inserting the fastening portion 40 within the opening C15 between the lips C11 and C12 the pin may be then rotated a predetermined number of degrees to thus fasten both fasteners 30 and 40 within the respective channel openings C29 and C19 of respective channels C2 and C1.

Figure 6:
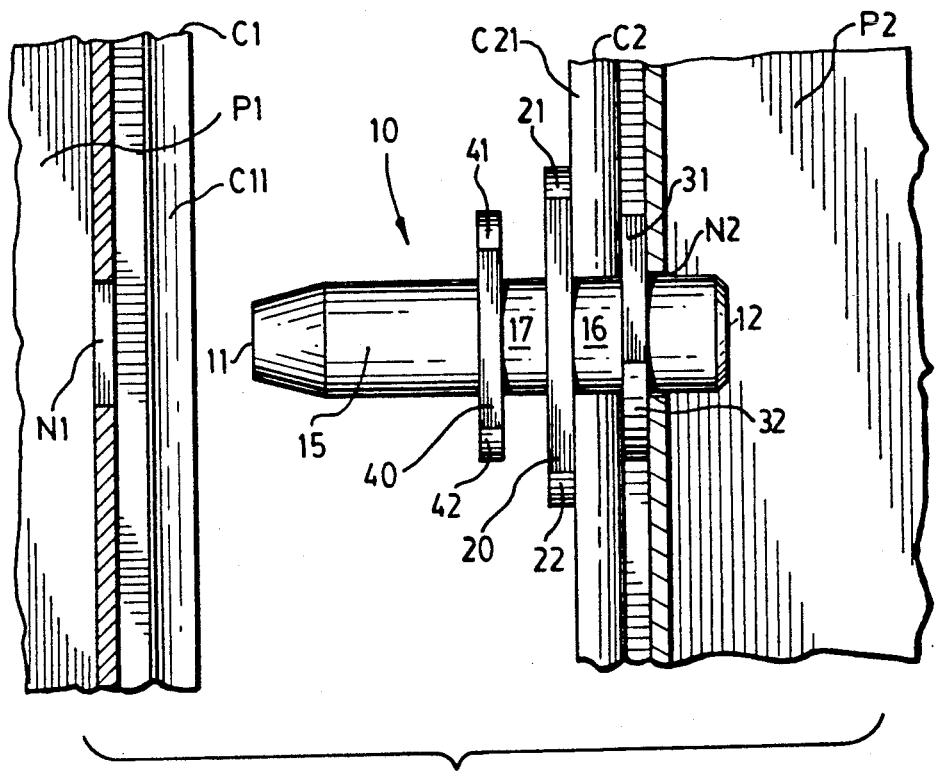
FIG. 6 is a side view of the positioning of the connector in relation to the channel of the panel as illustrated in FIG. 5 in a preferred embodiment of the invention.

Referring now to FIG. 6 there is illustrated in side cross-sectional view the positioning of the connector in relation to the channel portion C21. Thus the cylindrical segment 16 and cylindrical segment 17 are disposed between the fastening portions 30 and 40 and the detent member 20, which must be a distance which will be compatible with the dimensions of the channel lips C11 and C21. The distance of segments 16 and 17 are sized so that a snug fit will result when connecting the connector. FIG. 6 also illustrates the horizontal alignment of the openings N1 and N2 and the importance of the openings in aligning the pins and preventing the binding of the pin when connected or slippage of the pin if the ends 11 and 12 were not disposed through openings N1 and N2. It is not mandatory that the openings be present in every alternative embodiment.

Figure 7:
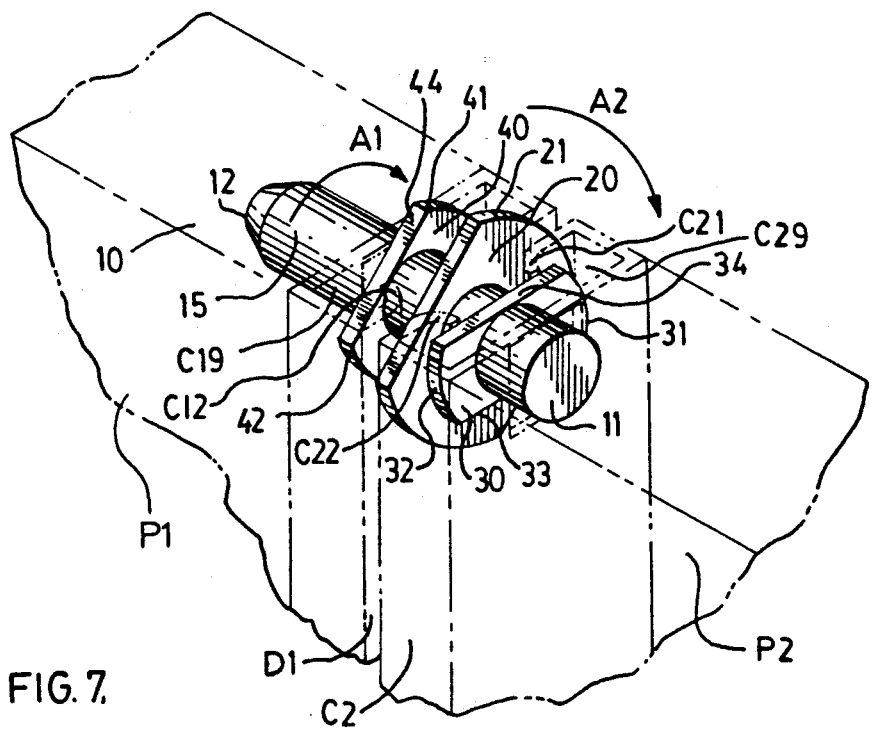
FIG. 7 is a perspective view of the connector connecting both panels together at the edges thereof in a preferred embodiment of the invention.

Referring now to FIG. 7 there is illustrated the panel portions P1 and P2 of FIG. 1 connected at the ends thereof, the pin connector 10, wherein the channel portions C1 and C2 are separated by a very small distance D1 which is generally the thickness of the detent member 20. Within this gap, sealing portions may be inserted to improve the aesthetic appearance of the panels when joined together. The sealing portions may be identical to those already found within the prior art. Thus the ends 11 and 12 of the connector 10 have been inserted within openings N1 and N2 of channel portions C1 and C2 respectively. The fastening portion 30 being initially aligned with the channel portions as described in relation to FIGS. 3 and 4 and rotated a predetermined angle Al to thus align fastening portion 40 within the channel opening C15 where the continued rotation of the member 20 connected to pin 10 will cause both connectors to take on the final positions as illustrated in FIG. 7. The panels of FIG. 7 have been cut along the radial axis of the pin 10 in a horizontal direction in order to observe the final locking positions of fastening portions 30 and 40 within channel openings C29 and C19 and the final resting position of detent member 20 between the channel portions. The locking of the connector in relation to the panels is accomplished by each face of each fastening portion 30 and 40 proximate the detent member 20 abutting against the ends of the lips C21, C22, C11 and C12 respectively for fasteners 30 and 40 thus preventing any disengagement of the connectors. To remove the connectors and disconnect the panels the opposite procedure is followed through that aforementionedly described. Thus the advantages of the instant invention are realized wherein the panels may be easily connected and easily disconnected.

Referring to FIG. 1 in relation to FIG. 7 it is illustrated that two connectors are used to connect panels P1 and P2 at the ends thereof. However the number of connectors will be proportional to the overall height of the panel and it is not intended that all preferred embodiments be only the use of two connectors but that in most cases at least two connectors will be required.

Figure 8:
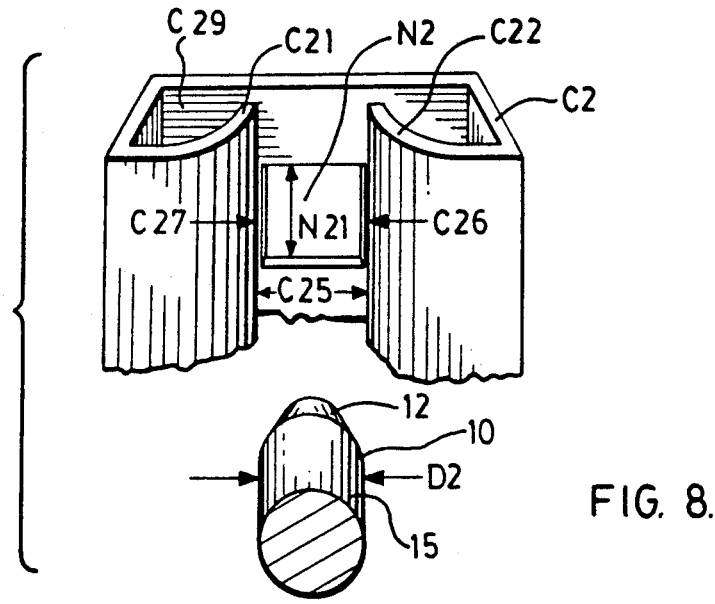
FIG. 8 is a perspective view of the channel portions of FIGS. 2 and 5 for alignment of the connector with the channel in a preferred embodiment of the invention.

Referring now to FIG. 8, there is illustrated a cross-sectional portion of pin 10 having the substantially cylindrical portion 15 of a predetermined diameter D2. Said diameter being less than the distance N21 of opening N2 for example to allow the end portions of the pin 12 to enter and be retained within the opening N2. It is also easily observed from FIG. 8 that the pin diameter D2 must be less than the distance between the sidewalls C26 and C27 of the channel C2 and that further the fastening portion 30 must have a width less than that dimension C25.

It is not necessary that channel portions be used in relation to the connector 10 in all of the alternative embodiments of the invention. For example, the channel portions may be completely eliminated if the panel portions have disposed on the ends thereof opening N2$^1$ which are not illustrated but are rectangular in shape and having dimensions slightly larger than the exterior of the fastening portions 30 and 40, wherein cylindrical segments 16 and 17, as illustrated in FIG. 6, would be predetermined by the thickness of the end of the panel. Thus the channels may be completely eliminated by the fastening portions extending through the opening and being rotated in a similar manner as described in relation to FIGS. 3 and 4 wherein the fastening is effectively accomplished by the abutment between the face of the fastener abutting the interior wall of the end portion of the panel. Thus in an alternative embodiment of the invention no channel portions are required.

Figure 9:
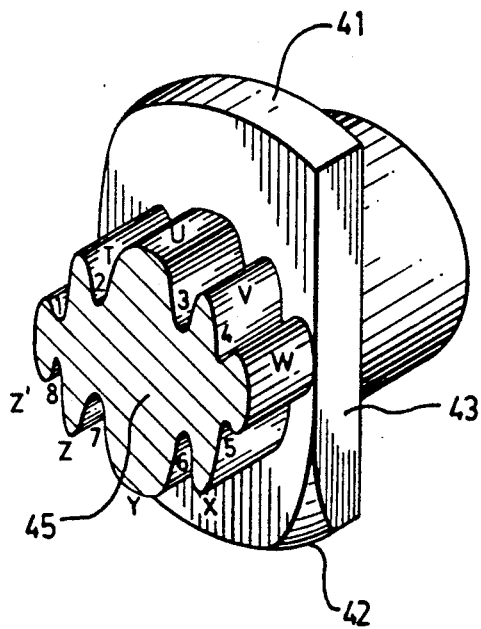
FIG. 9 is a close-up partial perspective view of the end of a connector 10 in an alternative embodiment of the invention.
Figure 9A:
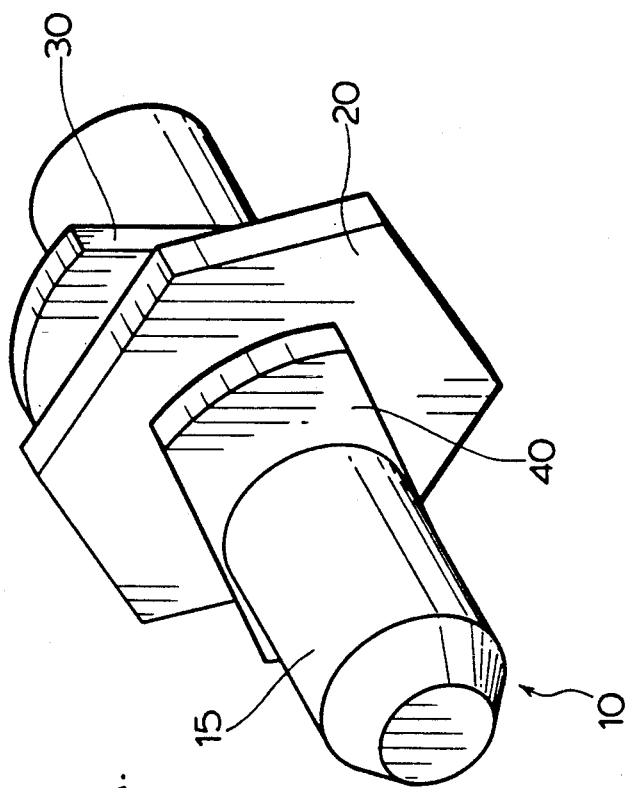
FIG. 9A is an alternative embodiment of the invention showing the detent as a hexagonal member.

Referring now to FIG. 9, there is illustrated a alternative embodiment of the invention being manufactured by conventional molding techniques, and being manufactured from thermoplastic materials of suitable resilience and strength having disposed at the end portions 11 or 12 an alternative cross-section in relation to portion 15 being substantially cylindrical wherein the portion takes on a uniform sinusoidal type of surface having recesses 1, 2, 3, 4, 5, 6, 7, and 8 disposed about the perimeter thereof and having apexes T, L, U, V, W, X, Y, Z and Z$^1$ which allow for the release of any stress within the thermoplastic materials when being molded and results in a modest savings of material as well. It is also observed in relation to FIG. 9 that the pin may not necessarily be cylindrical in shape, it may take on any shape of convenience. For example, the pin may be triangular or rectangular wherein the detent portion 20 is in effect part of the body of the connector and is not necessarily a separate portion within the connector.

As many changes can be made to the preferred embodiment of the invention without departing from the scope of the invention it is intended that all matter contained herein be illustrative of the invention and not in a limiting sense.

The embodiments of the invention in which an exclusive privilege or property is claimed are as follows:

1. Apparatus comprising: means for manually locking elements of a furniture system, the elements of the furniture system including a channel having locking surfaces and a bottom within which portions of the means for manually locking elements of a furniture system engage thus fastening the elements together, said means for manually locking elements of a furniture system comprising a rotatable portion having two ends, having disposed proximate one end at least a first appendage for engagement in use with locking surfaces of a channel and a first alignment means disposed on the bottom of the channel of one of said furniture elements and having disposed proximate the other end of said rotatable portion at least a second appendage for engagement in use with locking surfaces of a channel and a second alignment means disposed on the bottom of a channel of another of said furniture elements, said second appendage being engageable in use with locking surfaces of the channel and said second alignment means when said first appendage locks in use with said locking surfaces of said channel and said first alignment means, said first and second appendages being aligned within the channel of the elements of the furniture system by said first and second alignment means, said rotatable portion of said means for manually locking elements of a furniture system having disposed between its ends intermediate said at least a first and at least a second appendage integral detent means for rotating said means for manually locking elements of a furniture system when manually assembling said furniture system, said detent means being accessible by a separate tool to engage said detent means as required during manual assembly of the furniture system wherein rotation of said means for manually locking elements of a furniture system by said tool in a predetermined direction locks said at least a first appendage with said locking surfaces of said channel and said first alignment means of one furniture element and further rotation of said means for manually locking elements of a furniture system by said tool up to a predetermined amount locks said at least a second appendage with said locking surfaces of said channel and said second alignment means of another furniture element while retaining said at least a first appendage in a locked position with said locking surfaces of said channel and alignment means of the former furniture element.

2. The means for manually locking elements of a furniture system of claim 1, wherein adjacent furniture elements said alignment means are aligned openings disposed therein within which end portions of said locking means extend to properly align said appendages within said aligned openings.

3. Apparatus comprising: means for manually connecting a panel system, a first edge of the panel system having elements including alignment openings and locking surfaces adjacent said alignment openings therewith, said means for manually connecting a panel system comprising a pin having two ends and having disposed proximate one end a first laterally extending appendage and proximate the second end a laterally extending second appendage, said appendages extending laterally away from the pin, each appendage being permanently fixed in position with respect to the other appendage and being radially offset a predetermined number of degrees about the circumference of the pin from the other appendage, each appendage having at least one end and having disposed proximate each end portions for engagement in use with the locking surfaces disposed adjacent the alignment openings proximate the edge of the panel system providing alignment of said pin with said panel system, said first appendage being radially oriented to the central axis of said pin in a first direction and said second appendage being radially offset to the first appendage in a second direction, said pin having disposed intermediate the appendages integral detent means for manually rotating said pin when assembling said panel system; wherein manual rotation of said pin in a predetermined direction locks said first appendage with said locking surfaces disposed proximate the edge of the panel system within a first alignment opening of the panel system and further manual rotation of said pin up to a predetermined amount locks said second appendage with said locking surfaces disposed proximate the edge of said panel system within a second alignment opening of the panel system while retaining said first appendage in a locked and aligned position with said locking surfaces within said first alignment opening.

4. The means for manually connecting a panel system of claim 3, wherein each appendage comprises a pair of diametrically opposed flanges.

5. The means for manually connecting a panel system of claim 4, wherein the integral detent means is engageable with a tool.

6. The means for manually connecting a panel system of claim 4 wherein the the locking surfaces are provided with channel portions of the panels to be connected by the means for manually connecting a panel system, each channel portion comprising side walls leading into the channel and an end wall or bottom wall joining the side walls, the bottom wall of one channel of one panel comprising the first alignment opening therethrough aligned with the second alignment opening in the bottom wall of the channel of the other panel to be joined by the means for manually connecting a panel system such that the ends of the means for manually connecting a panel system engage with the alignment openings thus allowing for alignment of the appendages of the means for a manually connecting a panel system in the panels prior to its rotation.

7. The means for manually connecting a panel system of claim 3, wherein the integral detent means is engageable with a tool.

8. The means for manually connecting a panel system of claim 3, wherein said integral detent means comprises a hexagonal flange integrally formed with said pin.

9. The means for manually connecting a panel system of claim 3, wherein adjacent panels have aligned openings disposed therein within which end portions of said device extend to properly align said appendage within said aligned openings.

10. The means for manually connecting a panel system of claim 3, wherein the locking surfaces are provided with channel portions of the panels to be connected by the means for manually connecting a panel system, each channel portion comprising side walls leading into the channel and an end wall or bottom wall joining the side walls, the bottom wall of one channel of one panel comprising the first alignment opening therethrough aligned with the second alignment opening in the bottom wall of the channel of the other panel to be joined by the means for manually connecting a panel system such that the ends of the means for manually connecting a panel system engage with the alignment openings thus allowing for alignment of the appendages of the means for manually connecting a panel system in the panels prior to its rotation.

11. The means for manually connecting a panel system of claim 3, where said integral detent means comprises a hexagonal flange.

12. The means for manually connecting a panel system of claim 3, wherein said integral detent means comprises a nut integrally formed with said pin.

13. The means for manually connecting a panel system of claim 3, wherein said integral detent means comprises a nut attached to said pin.

14. Apparatus comprising: a releasable connector for a panel system having a locking surface and alignment means disposed on an edge of a panel of said panel system, the connector comprising a rotatable portion having two ends, having disposed proximate one end, a first appendage for engagement with the locking surface of the panel system in use and alignment portions for alignment with the alignment means of the panel system in use and having disposed proximate the other end of said rotatable portion at least a second appendage for engagement with the locking surface of the panel system in use offset radially a predetermined number of degrees about the circumference of the pin from the first appendage, and alignment portion for alignment with the alignment means of the panel system in use said rotatable portion having disposed intermediate said first and second appendage integral detent means for rotating said locking means, wherein in use upon alignment of the alignment portion of the connector and alignment means of the panel system manual rotation of said locking means in a predetermined direction with respect to elements of the panel system to be connected locks said first appendage and further rotation of said locking means up to a predetermined amount locks said second appendage while retaining said first appendage in a locked and aligned position.

15. Apparatus comprising: a connecting means for a panel system having locking surfaces and alignment means disposed on an edge of a panel of said panel system, the connecting means comprising a pin having two ends and having disposed proximate one end a first appendage and alignment portion and proximate the second end a second appendage for engagement with the locking surface of said panel system and said alignment portions for alignment with said alignment means of said panel system, said appendages extending laterally away from the pin, each appendage being offset a predetermined number of degrees about eh periphery of the pin from the other appendage, each appendage having at least one end, said first appendage being laterally oriented to the central axis of said pin in a first direction and said second appendage being radially offset, said pin having disposed intermediate its ends integral detent means for rotating said pin wherein in use upon alignment of the alignment portion of the pin and the alignment means of the panel system manual rotation of said pin in a predetermined direction locks said first appendage and further rotation of said pin up to a predetermined amount locks the second appendage retaining said first appendage in a locked and aligned position.

16. The connecting means of claim 15, wherein the pin is cylindrical.

17. The connecting means of claim 16, wherein each appendage has two ends.

18. The connecting means of claim 16, wherein each appendage comprises a pair of diametrically opposed flanges.

19. The connecting means of claim 15, wherein each appendage has two ends.

20. The connecting means of claim 15, wherein each appendage comprises a pair of diametrically opposed flanges.

* * * * *